Dec. 28, 1937.　　　J. C. STEVENS　　　2,103,600
SCOUR PREVENTION
Filed Dec. 21, 1935
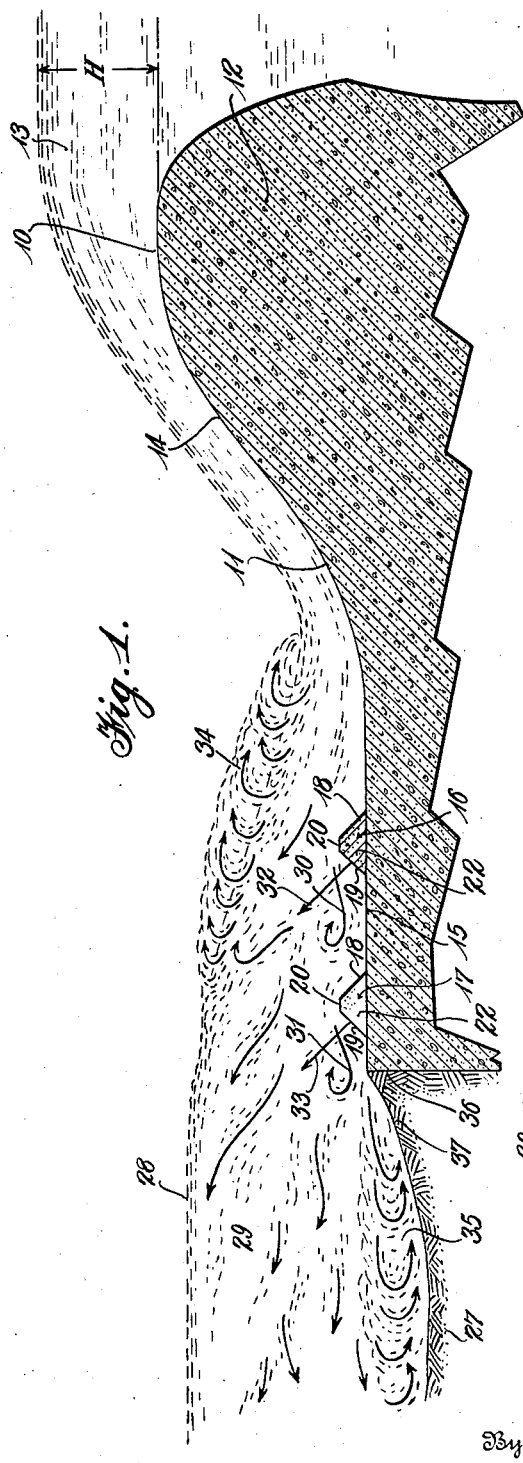
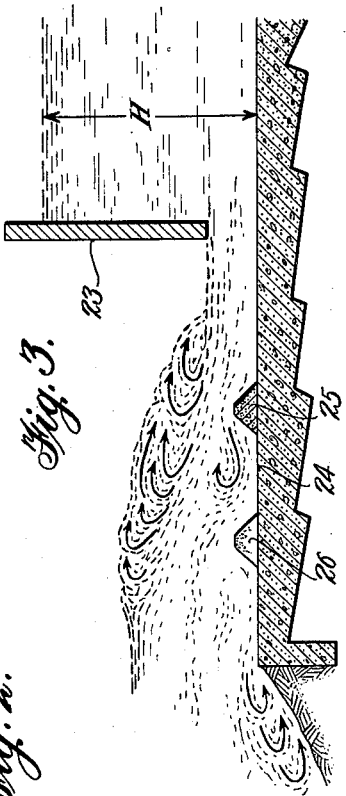
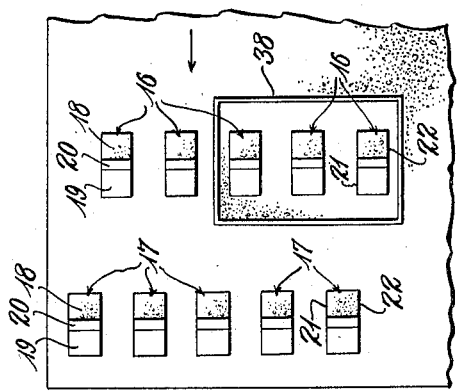
Inventor
John C. Stevens
By Richard K. Stevens
Attorney Patented Dec. 28, 1937

2,103,600

UNITED STATES PATENT OFFICE 2,103,600

SCOUR PREVENTION

John C. Stevens, Portland, Oreg.

Application December 21, 1935, Serial No. 55,668

9 Claims. (Cl. 61—18)

This invention relates to the prevention of scour of river bed material by water flowing at high velocities over dams and spillways, or through gates and other hydraulic structures.

Under certain conditions water may flow at different depths with the same energy content; for example, at a low stage with high velocity which is called a super-critical or shooting flow, or at a high stage with low velocity which is called a sub-critical or tranquil flow. Water in the super-critical condition possesses great kinetic energy as well as high velocity, and has great destructive power and scouring propensities, while in the sub-critical or tranquil condition it flows away at a moderate velocity and its capacity for or tendency to cause scour is greatly diminished. A condition of super-critical flow occurs under many different circumstances, such as on steep slopes where the water not only gains in velocity but changes in direction, or in water issuing from beneath a gate which is under considerable head. Such super-critical flow condition persists until the water encounters an obstruction, such as back water, a set of baffles, or a rough place in the channel, at which time the flow suddenly changes to the high stage, i. e. the sub-critical or tranquil flow condition. This sudden change or rise of the surface is called a "hydraulic jump", and occurs across the critical stage, i. e. the stage at which the energy content is a minimum.

In the case of an overflow dam the hydraulic jump occurs where the water flowing over the dam encounters the tail water, and this may be in varying positions with respect to the dam, depending upon the depth of the tail water as well as the depth and velocity of the water passing over the dam. When the tail water is high, for example, the jump may form against the sloping face of the dam, but when the tail water is low or at an intermediate level, the supercritical flow extends beyond the dam and the jump occurs on or over the stream bed. This causes an enormous scouring effect which will eventually undermine the dam and otherwise have detrimental effects.

It is accordingly a primary object of this invention to provide means for dissipating or converting into heat the major portion of the kinetic energy developed in an overflow dam, sluice gate, spillway or other hydraulic structure without appreciably causing or permitting the scouring of the stream bed materials immediately below or adjacent such structure. A further object of the invention is to convert a condition of low stage flow into a condition of high stage flow, i. e. to cause the hydraulic jump to take place, before the water leaves the relatively slow wearing surface of the dam or other structure.

These and other objects are accomplished by creating a multiplicity of eddy currents within the prism of water flowing over or through the dam or other hydraulic structure and simultaneously preventing these eddy currents from contacting the river or stream bed below or adjacent such structure at sufficiently high velocity to either remove materials or create a scouring action, or otherwise undermine or endanger the dam or similar structure.

Various arrangements for carrying out the purposes of the present invention have been developed by extensive research and numerous experiments, but it has been found that the arrangement shown in the accompanying drawing is the most effective. Although the drawing merely illustrates the invention as applied to an overflow dam and a water gate, it is to be understood that it is not limited thereto, but can be readily adapted to all kinds of hydraulic structures.

In the drawing,

Figure 1 represents a longitudinal section of an overflow dam provided with the devices constituting the invention;

Figure 2 is a plan view of a portion of the dam shown in Figure 1, and

Figure 3 is a longitudinal section of a water gate provided with my special scour prevention means.

In Figure 1, 10 represents the crest and 11 the bucket of an overflow dam 12 of concrete, masonry or other suitable material, over which the prism of water 13 is flowing under a head H. Bucket 11 constitutes a transition curve extending from the sloping face 14 to the apron 15, which is provided on its upper surface with two rows of baffles 16 and 17 extending transversely to the thread of the current. Baffles 16 and 17 preferably comprise wedge-shaped blocks having diagonal faces 18 and 19 and upwardly extending apices 20. The diagonal faces 18 slope upstream at an angle of approximately 45° from the horizontal while diagonal faces 19 slope downstream at substantially the same angle. The two remaining sides 21 and 22 of each block are parallel to each other and perpendicular to apron 15, and extend in substantially the direction of flow of the water.

The individual baffles in each row are preferably arranged in staggered relation to the individual baffles in the other row, that is, the baffles in one row are disposed in longitudinal alignment with the spaces in the other row (see Figure 2). This produces certain effects which will be described in detail hereinafter. Moreover, it has been found by numerous experiments that, although the size, shape and spacing of the blocks may be varied, results are decidedly better when the distance between the center lines of the two rows is from four to six times the height of the blocks, which should in turn be from one-sixth to one-third the maximum depth of tail water flowing over the deck of the apron. It is also preferable to provide clear spaces between the transverse rows of blocks which are about fifty percent wider than the streamwise length of one of the blocks, and to space the individual blocks in each row at a distance approximately equal to the width of one of the blocks.

In Figure 3 the invention is shown as applied to a water or sluice gate in which 23 represents the gate under the head H, and 24 represents the apron upon which are disposed rows of baffles 25 and 26 similar in all respects to baffles 16 and 17 shown in Figures 1 and 2.

The effects of employing my invention in connection with dams and other hydraulic structures is to the best of my knowledge as follows, reference being made for convenience to the dam shown in Figure 1: As the water flowing over dam 10 passes over the first row of baffles 16, the filaments in the lower strata of water prism 13 encounter the upstream sloping faces 18 of the blocks 16 and are thereby forced upwardly in spaced or alternate streams. These upwardly shooting streams pass through and tend to deflect upwardly the otherwise horizontally flowing filaments in the upper strata of the water prism, causing the various filaments or streams to intermingle and form a large number of eddies and cross currents.

Simultaneously alternate filaments in the lower strata pass through the spaces between the baffles 16 and contact the upstream sloping faces 18 of the baffles 17, which deflect them upwardly into the mass of eddies and cross currents already formed, thereby creating additional eddies. As the water flows away from the dam all these eddies and cross currents are carried away with minimum scouring effect since they have been deflected upwardly away from the stream bed 27 and toward the surface 28 of the tail water 29. Moreover, these eddies and cross currents develop heat by reason of the friction and impact between the water particles, and this heat raises the temperature of the water slightly converting the kinetic energy thereof to harmless thermal energy, thereby greatly reducing its velocity and further robbing the water of its ability to scour.

As the water passes over the baffles an area of reduced pressure is formed over the faces 19 which slope downstream, that is, in the lee of each baffle, and since in some instances the pressure in these areas is less than atmospheric, a partial vacuum or condition of cavitation is created. This condition is extremely unstable, as the pressure alternately rises and falls or collapses and reforms, thereby producing intermittent collapsing effects which produce violent stray currents, such as shown at 30 and 31. These currents shoot through the water prism in the manner of a lashing whip and have exceedingly great scouring potentialities. It has been found, however, that they are directed upwardly toward the surface of the tail water 29 and their energy is expended harmlessly in eddy currents instead of against the stream bed 27 owing to the fact that their direction is determined entirely by the slope of the baffle and the disposition of the low pressure area from which they emanate. Actually, the stray currents are directed at right angles outwardly from block faces 19, as shown by the arrows 32 and 33, since these faces constitute the boundaries of the low pressure areas and receive the recoil or reaction resulting from their collapse.

The water rises to tail water depth as it passes over apron 15, and while doing so forms a surface eddy 34 of revolving water, the axis of revolution of which is transverse to the stream flow. This eddy is formed substantially above the baffles, acts to convert kinetic energy into thermal energy, reduces the velocity of the water and also lessens its ability to scour. The eddy is produced as a result of the tendency of the water to flow down the adverse slope of the rising prism at the position of hydraulic jump.

Beyond the apron but adjacent thereto another important eddy 35 is formed by the filaments of water which have been deflected upwardly by the baffles, as well as by the residual horizontally flowing filaments in the tail water prism 29. This eddy also revolves about a transverse axis, but revolves slowly in comparison with eddy 34 so that the water revolving within it has little ability to scour, and whatever scouring tendency exists tends to move material upstream, thereby depositing material against the end 36 of apron 15 as shown at 37. Hence, there is substantially no danger of the dam or other hydraulic structure being gradually undermined, since the material immediately below the dam, where the greatest scouring action usually takes place, is deposited against the structure instead of being carried away.

If the water carries sand, silt or other sediment it will in time cause wear of the baffle blocks, rounding their corners and thus diminishing their efficiency. It is therefore necessary, as a part of the regular program of maintenance of structures of the nature described, to occasionally examine these baffle blocks and make whatever repairs appear to be necessary. Since these blocks are separated from each other on an otherwise plane surface, examination and repair is rendered quite easy. In the event however that the blocks are perpetually submerged a caisson may be floated in place and sunk over any desired number of baffle blocks, the lower edge of the caisson resting on the plane deck of the apron in the rows and spaces between the blocks. The operation of the caisson, which is shown at 38 in Figure 2, is in the customary manner, a water seal being first formed and the water being then pumped out.

The baffle blocks may be made of concrete which is cast integrally with the concrete apron, or steel dowels may be inserted in the apron and the blocks poured around the same using a stronger concrete mixture than that of the apron. The baffle blocks may also be bolted to the apron, and both the apron and the blocks may be made of timber if desired.

While the preferred form and arrangement of the baffle blocks has been described it is obvious that the size or the spacing of the blocks in one row may be varied relative to the size and spacing of the blocks in the other row or in the same row. Moreover, the number of rows may be increased or diminished, and the slope of both the up and down stream faces of the baffle blocks may be changed without departing from the spirit of the invention.

What I claim is:

1. An hydraulic structure for controlling the flow of a liquid stream comprising a substantially horizontal apron and a plurality of baffle blocks arranged in rows thereon, the individual blocks in each row having faces sloping upstream and downstream respectively and being staggered with respect to the individual blocks in an adjacent row and each of the faces being in one plane extending transversely perpendicular to the direction of flow of said stream.

2. An hydraulic structure for controlling the flow of a liquid stream comprising a substantially flat and horizontal apron having a plurality of spaced baffle blocks thereon, each of the baffle blocks not being contiguous to any other block and having a pair of exposed surfaces sloping upstream and downstream respectively at an angle of about 45° to the horizontal and another pair of surfaces substantially perpendicular to the apron and extending in the direction of flow.

3. An hydraulic structure for controlling the flow of a fluid stream comprising a substantially horizontal apron and a plurality of baffle blocks thereon, having faces sloping upstream and downstream respectively at an angle of substantially 45°, the plane of each sloping face being transversely perpendicular to the direction of fluid flow.

4. An hydraulic structure for directing the flow of a fluid stream comprising an overflow apron and a plurality of baffle blocks arranged in rows thereon, the individual blocks in each row each having a face sloping upstream and being staggered with respect to the individual blocks in an adjacent row, each sloping face being in one plane which is transversely perpendicular to the direction of fluid flow.

5. An hydraulic structure for directing the flow of a fluid stream comprising an overflow apron and a plurality of spaced baffle blocks arranged in rows thereon, the blocks in each row having their apices upward and faces sloping upstream and downstream respectively and being arranged in streamwise alignment with the spaces in an adjacent row, the spaces between the blocks in the same row being less wide than the space between the blocks in different rows, and each of said faces extending transversely perpendicularly to the direction of flow of said stream.

6. An hydraulic structure for directing the flow of a fluid stream comprising an overflow apron and a plurality of baffle blocks arranged in transverse rows thereon, the individual blocks in each row being of the same size and spaced from each other by a distance substantially equal to the width of one of the blocks and being positioned in longitudinal alignment with the spaces in an adjacent row and having a face sloping downstream at an angle of substantially 45°, said face extending down to said apron and being transversely perpendicular to the direction of flow of said stream, and each row being spaced from an adjacent row by a distance greater than the distance between adjacent blocks in the same row.

7. An hydraulic structure for directing the flow of a fluid stream comprising an overflow apron and a plurality of spaced baffle blocks arranged in transverse rows thereon, the individual blocks in each row having faces sloping upstream and downstream respectively and being of the same size and spaced at distances approximately equal to the width of one of the blocks, and the rows having their center lines separated by a distance from four to six times the height of the blocks and their adjacent edges separated by a distance about fifty percent greater than the streamwise length of the blocks, and each of said faces being transversely perpendicular to the direction of flow of said stream.

8. An hydraulic structure for controlling the flow of a liquid stream comprising a substantially horizontal apron having a plurality of spaced baffle blocks thereon, each of the baffle blocks not being contiguous to any other block and having a pair of exposed surfaces sloping upstream and downstream respectively and each of the surfaces being in one plane extending transversely perpendicularly to the direction of flow of said stream.

9. An hydraulic structure for controlling the flow of a liquid stream comprising a substantially horizontal apron and a plurality of spaced baffle blocks superimposed thereon, each of the baffle blocks not being contiguous to any other block and having an exposed face sloping upstream, said face being in one plane and extending transversely perpendicularly to the direction of flow of said stream.

JOHN C. STEVENS.